(12) United States Patent
Brexel et al.

(10) Patent No.: US 7,810,023 B2
(45) Date of Patent: Oct. 5, 2010

(54) PROCESS FOR GENERATING PERSONALIZED DIGITAL DIRECTORY PAGES

(76) Inventors: Catherine Brexel, 19-21, route des Gardes, F-92190 Meudon (FR); Nathalie Vivensang, 17-19, rue d'Estienne d'Orves, F-92250 La Garenne-Colombes (FR)

( * ) Notice: Subject to any disclaimer, the term of this patent is extended or adjusted under 35 U.S.C. 154(b) by 610 days.

(21) Appl. No.: 11/352,161

(22) Filed: Feb. 10, 2006

(65) Prior Publication Data

US 2006/0129579 A1      Jun. 15, 2006

Related U.S. Application Data

(63) Continuation of application No. 10/422,469, filed as application No. PCT/FR01/03326 on Oct. 26, 2001, now Pat. No. 7,020,646.

(30) Foreign Application Priority Data

Oct. 27, 2000      (FR) .................................. 00 13856

(51) Int. Cl.
*G06F 17/00* (2006.01)
(52) U.S. Cl. .................. 715/207; 715/208; 709/203
(58) Field of Classification Search ............... 715/207, 715/208; 709/202, 203
See application file for complete search history.

(56) References Cited

U.S. PATENT DOCUMENTS

| | | | |
|---|---|---|---|
| 6,199,082 B1 | 3/2001 | Ferrel et al. | |
| 6,516,337 B1 | 2/2003 | Tripp et al. | |
| 6,628,940 B1 * | 9/2003 | Henrick | 455/419 |
| 6,632,248 B1 * | 10/2003 | Isaac et al. | 715/273 |
| 6,848,075 B1 * | 1/2005 | Becker et al. | 715/205 |
| 7,039,860 B1 * | 5/2006 | Gautestad | 715/205 |
| 7,076,743 B2 * | 7/2006 | Ingram et al. | 715/854 |
| 7,475,346 B1 * | 1/2009 | Bullock et al. | 709/203 |
| 2002/0078102 A1 * | 6/2002 | Dutta | 707/526 |
| 2002/0194267 A1 * | 12/2002 | Flesner et al. | 709/203 |
| 2005/0171947 A1 * | 8/2005 | Gautestad | 707/5 |

FOREIGN PATENT DOCUMENTS

| | | |
|---|---|---|
| EP | 1 030 247 A2 | 8/2000 |
| WO | WO 00/55741 A1 | 9/2000 |

OTHER PUBLICATIONS

Richard M. Keller et al., *A bookmarking service for organizing and sharing URLs*, Computer Networks and ISDN Systems, vol. 29, No. 8-13, Sep. 1, 1997, pp. 1103-1114.

* cited by examiner

*Primary Examiner*—Pierre M Vital
*Assistant Examiner*—Christopher J Raab
(74) *Attorney, Agent, or Firm*—DLA Piper LLP (US)

(57) ABSTRACT

A process for generating personalized digital directory pages for display with a navigator program including a personalization step including recording in a temporary memory of a client station a digital file corresponding to an HTML page comprising hypertext links for access to other pages and descriptors associated with pictograms and proceeding to a display of the page on the client station, recording in a temporary memory of the client station at least one personalization file comprising a link identifier and at least one personalization descriptor selected by the user, transmitting the content of the temporary memory to the server, and recording in a server memory the personalization file data linked with the user identifier and the link identifier in question.

13 Claims, 2 Drawing Sheets

IPD
Interactive
Personal Directory.

Navigator in the city ▼
Custom directory ▼

L'Aide Vidéo (1mn 30) ▲ | VOYAGES > Agences Spécialisées > Amérique du Nord | Compte : Nathalie VIVENSANG Modes d'Affichage ▼
- Toute ma liste
- Le Best Of des membres
- Mes présélections
- Les nouveaux sites en ligne
- Mes sites marqués (pioche)
- Mes sites commentés
- Les liens sans les textes Services pratiques ▼
- Ajouter un site à ma liste
- Historique de Navigation
- Ajouter / Suppr. cette page dans l'Annuaire à la carte
- Imprimer la liste
- Consulter l'Aide en ligne
- Env. cette page à 1 ami(e)

——— Shopatoo ———
- Les Boutiques Spécialisées
- Toutes les Offres Spéciales
- Tous les Achats Groupés
- Les Ventes aux Enchères

- Téléchargez « Real Vidéo »
- Téléchargez le Traducteur
- Le Concours du mois !
- Les Listes de Diffusion
- Sondage

All a dream Tour ★★★
Organisation de séjours aux Etats-Unis : circuits 4x4, circuits golf, etc. Location de voitures et activités aux Etats-Unis, individuels et groupes.

First USA Canada ★★★  *Infos +*
« Promos régulières et intéressantes. Bons plans sur les rocheuses (séjours neige). Excellent rapport qualité/prix d'après les membres d'Atoo-voyages (voir avec lup.bideau@mabulle.com). »

Globe Trotter Aventure Canada ★★☆  *Nouveau*
Voyagiste spécialisé dans l'organisation de forfaits-vacances au Québec : motoneige, traîneau à chiens, pêche sur glace, expérience amérindienne, vélo de montagne, observation des baleines...

Go West Tours ★★☆
Voyages de groupes dans l'Ouest américain. Agence implantée en Californie et disposant d'un bureau de liaison à Paris. Exemple : itinéraire de 15 jours dans l'Ouest américain.

Maison des Amériques ★★☆  *Infos +*
« Consulter régulièrement les propositions ponctuelles. Ils ont de très bons tarifs en vols secs intérieurs et des promos extra pour Disney World à Orlando. »

Non Stop USA ★★☆
Situé dans l'Ouest canadien, Il propose de découvrir l'Alberta et la Colombie Britanniques par thèmes variés, tels que : la nature, l'histoire, la religion, le sport, l'aventure, etc.

Planet-adventure ★★☆  *Infos +*
Situé dans l'Ouest canadien, Il propose de découvrir l'Alberta et la Colombie Britanniques par thèmes variés, tels que : la nature, l'histoire, la religion, le sport, l'aventure, etc.

Tours Franco Fun ★★☆  *Nouveau*
Situé dans l'Ouest canadien, Il propose de découvrir l'Alberta et la Colombie Britanniques par thèmes variés, tels que : la nature, l'histoire, la religion, le sport, l'aventure, etc.

Figure 2

PROCESS FOR GENERATING PERSONALIZED DIGITAL DIRECTORY PAGES

RELATED APPLICATION

This is a continuation of U.S. Ser. No. 10/422,469, filed Apr. 24, 2003, which is a continuation of International Application No. PCT/FR01/03326, with an international filing date of Oct. 26, 2001, which is based on French Patent Application No. 00/13856, filed Oct. 27, 2000.

FIELD OF THE INVENTION

This invention pertains to an interactive personal directory constituted in the form of digital pages transmitted by a server to a client station connected to the Internet or to a telecommunications network.

BACKGROUND

Known in the state of the art are various patents pertaining to processes for generating directory pages.

As an example, WO 00/55741 pertains to a system and management and link classification process (also called URL, or Uniform Resource Locator) which enables creation of public and personal repertoires of these links with the goal of improving Internet navigability. In various forms of implementation, that system stores Web links for multiple users in a database and provides processes for the extraction and posting of these Web links, processes for searching for Web links that are linked to existing links that a user stored in the system, as well as other associated characteristics. The users can organize and manage the link collections and search for related links in the link collections of other users. The characteristic criteria for database correspondence can use other information to search for relationships such as the user profile information comprising, e.g., age, sex and type of professional activity.

The article "A bookmarking service for organizing and sharing URLs" published in "Computer Networks and ISDN Systems", North Holland Publishing, Amsterdam, Vol. 29, No. 8-13 of Sep. 1, 1997, describes another solution for constituting a collection of links and personalizing this collection.

It would therefore be advantageous to enable each user connected to a page server via a network of the Internet or intranet type to personalize a directory in an interactive manner by associating personal descriptors with the proposed sites.

SUMMARY OF THE INVENTION

This invention relates to a process for generating personalized digital directory pages for display with a navigator program including a personalization step including recording in a temporary memory of a client station a digital file corresponding to an HTML page including hypertext links for access to other pages and descriptors associated with pictograms and proceeding to a display of the page on the client station, recording in a temporary memory of the client station at least one personalization file including a link identifier and at least one personalization descriptor selected by the user, transmitting the content of the temporary memory to the server, and recording in a server memory the personalization file data linked with the user identifier and the link identifier in question.

BRIEF DESCRIPTION OF THE DRAWINGS

Better comprehension of the invention will be obtained from the description below of a nonlimitative example of implementation with reference to the attached drawings in which:

FIG. 2 represents a view of the display generated by the process according to the invention.

DETAILED DESCRIPTION

Figure 1:
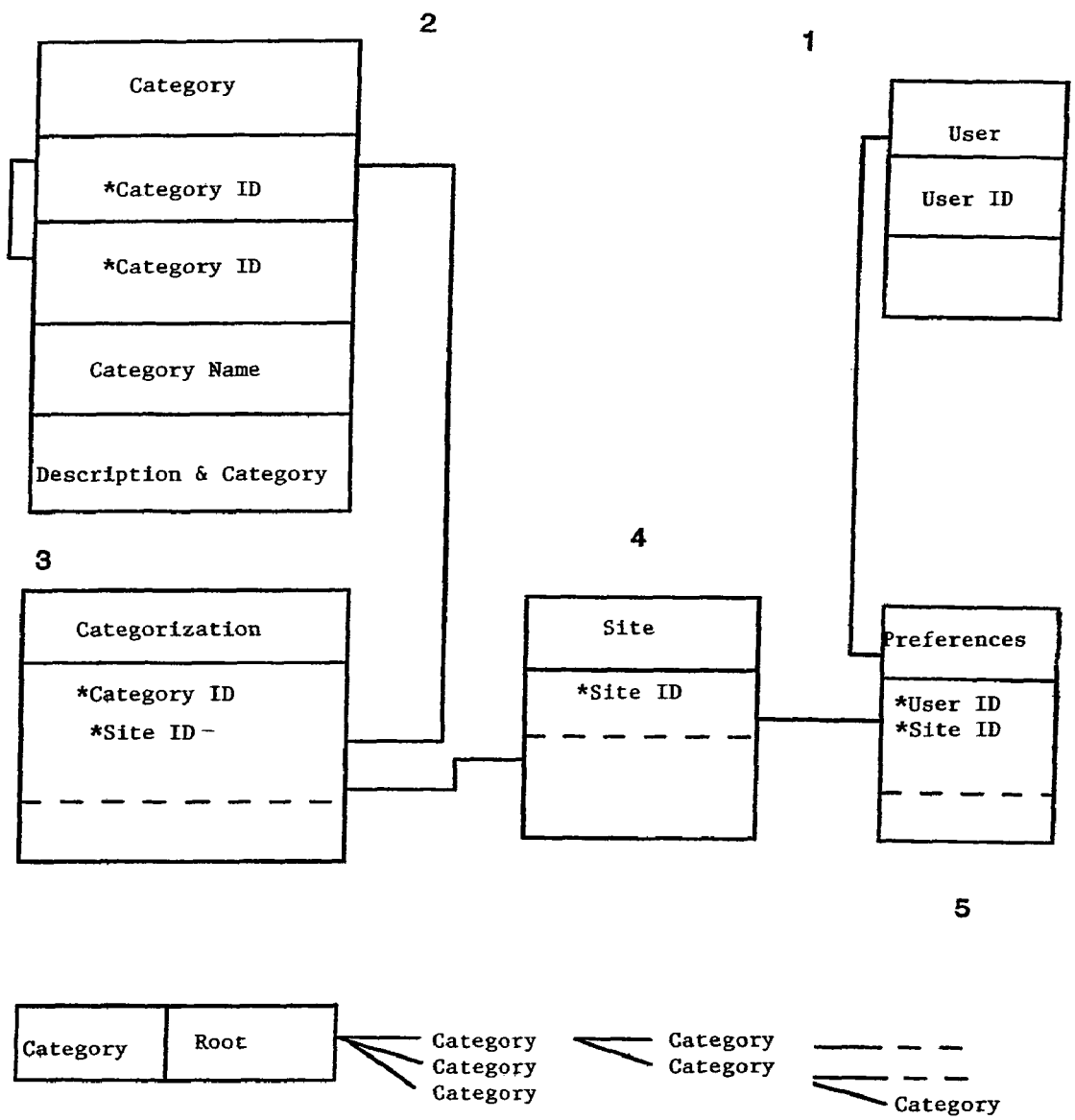
FIG. 1 schematically represents the architecture of the server.

The invention provides greater comfort and freedom for the internaut by allowing management of successive navigations and to modify and enrich the content of the lists that are offered.

For this purpose, the invention pertains in its broadest sense to a process for generating personalized digital directory pages intended to be displayed with a navigator type program, comprises a personalization step:

recording in a temporary memory of a client station a digital file corresponding to an HTML page comprising hypertext links for access to other pages as well as descriptors associated with pictograms and proceeding to the display of the page on the client station, recording in a temporary memory of the client station at least one personalization file comprising a link identifier and at least one personalization descriptor selected by the user, transmitting the content of the temporary memory to the server, and recording in the server memory the personalization file data linked with the user identifier and the link identifier in question.

According to a preferred mode of implementation, there is recorded in a server memory a first database of users comprising for each user a unique identifier and at least one associated user descriptor, a second database of sites comprising for each site a unique identifier and an address, a third table of site categories comprising for each category a unique identifier and a multiplicity of site identifiers, and a fourth database of descriptors comprising a unique identifier for each descriptor and a multiplicity of site identifiers and user identifiers, with a request stemming from a client station comprising a category identifier and the user identifier, and causing generation of a file comprising the site identifiers associated with the category identifier transmitted by the client station, and for each of the site identifiers the category identifier corresponding to the site identifier and the user identifier in question.

The selection of the descriptor by the user is advantageously performed by the designation of one of the pictograms displayed on the directory page, the recording of the identity of the displayed pictogram descriptor, by the designation of the site and the transmission by the client station to the server of a digital file comprising pairs formed by at least one category descriptor and a site identifier.

According to another aspect, the page display means comprise a filter enabling selection of the identifiers of the sites to be displayed as a function of the associated personal descriptor value.

According to yet another aspect, the process comprises a step of selecting sites to be deleted including selecting a deletion pictogram, selecting one or more site identifiers, and assigning a predefined value to the descriptor corresponding to each of the selected sites, then transmitting this information to the server for the recording in the descriptor database of the value in relation with the sites to be deleted.

These sites are in fact only deleted from the displayed list. They can be reactivated by a subsequent operation.

The process advantageously comprises a step for the addition of sites to a category including selecting a site identifier and assigning to it a value corresponding to an existing category, then transmitting said information to the server and recording in the category database the identifier of the selected site.

This operation can be performed by an action on a "copy" pictogram associated with a link to an application performing the operations in question and designating the destination (category). It also enables adding a site which is not in the database and adding it to a category by means of a form to be filled out.

According to another aspect, the process comprises recording on the server new categories of sites specific to a user or to a user community.

Turning now to FIG. 1, the server comprises a set of tables:
a table (1) of "users" in which are recorded for each user a unique identifier $ID_{ut}$ as well as the user's personal data;
a table (2) of "categories" in which are recorded for each category or family of sites a unique identifier $ID_{cat}$ as well as a text or graphical designation of the category, a description and optionally a unique identifier $ID_{cm}$ corresponding to a class of categories that groups together multiple categories;
a table (3) containing the identifiers of categories and sites belonging to that category;
a table (4) of "sites" containing unique identifiers of sites $ID_{site}$ and the IP address of the site as well as optionally a descriptor of the site;
a table (5) of "preferences" in which are recorded for each user and each site a preference indicator.

The preference indicator is modified by the user from a client station. The internaut selects a category of sites by sending a request constructed by the selection of a hypertext link displayed on the computer screen and the recording of an identifier associated with this hypertext link, and transmitting it to the server in the form of a digital file containing the selected category identifier as well as a user identifier. In return, the server sends a file containing the information associated with the category identifier and the list of sites associated with this category identifier as well as the preference indicators if such exist. This file is used by a navigator to produce a screen such as is represented in FIG. 2.

The user has available a collection of pictograms that can be selected for annotating a site appearing on the list. The pictogram "to visit" enables preselecting sites that the internaut wants to visit subsequently.

The pictogram "remove" allows removal of a pictogram appearing in relation with a listed site by superposition with the existing pictogram. The pictogram "preloading" enables the command to preload the site. It is associated with a computer procedure commanding the appearance of a clickable icon for opening a window with the HTML page loaded in cache memory. The computer procedure moreover causes modification of the appearance of the pictogram as a function of the preloading status (in the process of loading in the cache memory, preloaded and immediately displayable, or already displayed during the session).

The "smileys" pictograms allow annotation regarding the interest level of a site.

The "comment" pictogram enables recording of a comment related to a site. This function also allows replacement of the summary proposed by the "site" table with a personal comment recorded in the "preferences" table.

The sites bearing comments are presented in relation with a clickable pictogram enabling display alternatively of the personal comment or the public summary. Recording the personal comment can optionally be supplemented by the recording of information for the display solely of the personal comment or of the personal comment accompanied by the public summary, or of a clickable icon enabling switching back and forth between the two types of comments.

The "vote" pictogram allows associating with the site an indicator common to multiple users, making it appear in the "best of" or the preferred sites of an internaut community.

The display also has additional functions such as:
a list of short cuts enabling direct access to preferred pages,
a history storing in memory and displaying the list of recently visited sites,
an add function for adding sites from other lists. This function can include adding a site created by the internaut.

Another function is the personalized management of favorite sites. This function includes recording in a table the identifiers of sites preselected by the user, and of creating in the welcome page a list of the preselected sites to enable rapid access to these sites by a hypertext link. Favorite sites are designated by the attribution of a pictogram which, in addition to adding a visible mark in the margins of the designated sites, also automatically integrates them in the list of favorite sites.

Another function includes recording in a category table a personal category in which the user can register selected or created sites constituting a directory corresponding to these personal interest centers.

Another function includes assigning to selected sites a "to visit" icon enabling filtering the display of the directory page so as to optionally display only the sites bearing this indicator in the corresponding table associated with the user.

The HTML page optionally comprises a library of unassigned pictograms enabling modification of the graphical form of the standard pictograms or the creation of additional functions. This library can be displayed in an additional window or in part of the principal window.

The invention is described above as a nonlimitative example.

The invention claimed is:

1. A process for generating personalized digital directory pages comprising:
providing at least one computing device comprising a memory for storing instructions and a processor for executing said instructions, and utilizing said at least one computing device to perform the steps of:
a. requesting and receiving an HTML page related to a user search related link on a server from a client station, the HTML page comprising a plurality of hypertext links for access to other pages associated with the user search related link;
b. receiving and storing a digital file from said server in a temporary memory of the client station, said digital file corresponding to said HTML page and comprising said hypertext links for access to said other pages associated with the user search related link;
c. displaying said digital file on the client station and, based on user selection, recording a personalization file in said temporary memory, said personalization file comprising, for each of one or more hypertext links from said digital file, at least a selected identifier of a hypertext link and a corresponding selected personalization indicator for said hypertext link, wherein each selected identifier and corresponding selected personalization indicator, represents user preference with respect to the associated hypertext link, wherein said user is not required to visit said hypertext link;

d. transmitting said personalization file from the temporary memory to the server and recording therein, for each of one or more hypertext links from said digital file, said selected identifier of a hypertext link and said corresponding selected personalization indicator, linked with a user identifier, for subsequent access.

2. The process according to claim 1, wherein:

a. comprises:
   a1. requesting an HTML page on a server from a client station, the request comprising a user identifier; and b. comprises:
   b1. receiving a digital file from said server, said digital file corresponding to said HTML page and comprising hypertext links for access to other pages and personalization indicators associated with hypertext links based on said user identifier, and
   b2. storing said digital file in a temporary memory of the client station.

3. The process according to claim 1, wherein:

c. comprises:
   c1. displaying personalization pictograms with said digital file, each such pictogram being associated with a personalization indicator,
   c2. selecting a personalization indicator and an identifier of an hypertext link based on the user association of the corresponding personalization pictogram and the corresponding hypertext link, and
   c3. recording said selected identifier of a hypertext link and the corresponding selected personalization indicator in said personalization file.

4. The process according to claim 1, wherein c. comprises recording, based on user selection, a personalization attribute of a selected hypertext link in the personalization file in said temporary memory, said personalization attribute being associated with an identifier of the selected hypertext link in said personalization file.

5. The process according to claim 4, wherein said personalization attribute is user defined text information.

6. The process according to claim 4, wherein said personalization attribute is a category having a category identifier associated with an identifier of the selected hypertext link in said personalization file.

7. The process according to claim 1, wherein c. comprises updating display of said digital file upon a user selection defining a rule.

8. The process according to claim 7, wherein said rule comprises displaying only those hypertext links within said digital file associated with a user selected personalization indicator upon said user selection.

9. The process according to claim 1, further comprising:

e. storing said selected identifier of a hypertext link, said corresponding selected personalization indicator and said user identifier in at least one database recorded in a server memory.

10. The process according to claim 9, wherein:

e. comprises:
   e1. storing said selected identifier of a hypertext link, said corresponding selected personalization indicator and said user identifier in a table of said database, said table comprising records each containing triplets designating a user identifier, a hypertext link identifier and a personalization indicator.

11. The process according to claim 9, wherein said database comprises:

a first table comprising records, each containing couples designating a hypertext link identifier and a hypertext link address;

a second table comprising records, each containing couples designating a user identifier and user information; and a third table comprising records, each containing triplets designating a user identifier, a hypertext link identifier and a personalization indicator.

12. The process according to claim 11, wherein said database further comprises:

a fourth table comprising records, each containing a personalization attribute identifier and a personalization attribute content; and a fifth table comprising records, each containing a personalization attribute identifier and a hypertext link identifier.

13. The process according to claim 1, wherein said personalization indicator comprises at least one of an indicator selected from the group consisting of a deletion indicator, a favorite indicator and a pre-loading indicator.

* * * * *